United States Patent [19]

De Agro

[11] Patent Number: 4,894,766
[45] Date of Patent: Jan. 16, 1990

[54] POWER SUPPLY FREQUENCY CONVERTER

[75] Inventor: William De Agro, Levittown, N.Y.

[73] Assignee: Hazeltine Corporation, Greenlawn, N.Y.

[21] Appl. No.: 275,840

[22] Filed: Nov. 25, 1988

[51] Int. Cl.$^4$ .............................................. H02M 5/22
[52] U.S. Cl. ...................................... 363/159; 363/165
[58] Field of Search ................ 363/10, 157, 159, 160, 363/161, 163, 164, 165

[56] References Cited

U.S. PATENT DOCUMENTS 3,300,708  1/1967  Rhyne, Jr. et al. .................. 363/163

Primary Examiner—Patrick R. Salce
Assistant Examiner—Emanuel Todd Voeltz
Attorney, Agent, or Firm—E. A. Onders

[57] ABSTRACT

The present invention achieves the above objects, among others, by providing apparatus for converting a supplied AC input signal into an AC output signal having a selected lower frequency than the frequency of the AC input signal, which apparatus translates individual half cycles of the supplied AC input signal to an intermediate output signal with selected amplitude and polarity such that during successive pairs of first and second periods, each such period corresponding to a predetermined number of half cycles of the AC input signal, the translated half cycles of the AC input signal all have the same first selected polarity during each first period and have the same second selected polarity during each second period, with the first and second polarities being opposite. The apparatus filters the intermediate output signal to develop the AC output signal having the selected lower frequency. Thus, the frequency of the AC output signal will be a selected fraction of the frequency of the AC input signal, the fraction being equal to the frequency of the AC input signal divided by the predetermined selected number of half cycles.

5 Claims, 4 Drawing Sheets

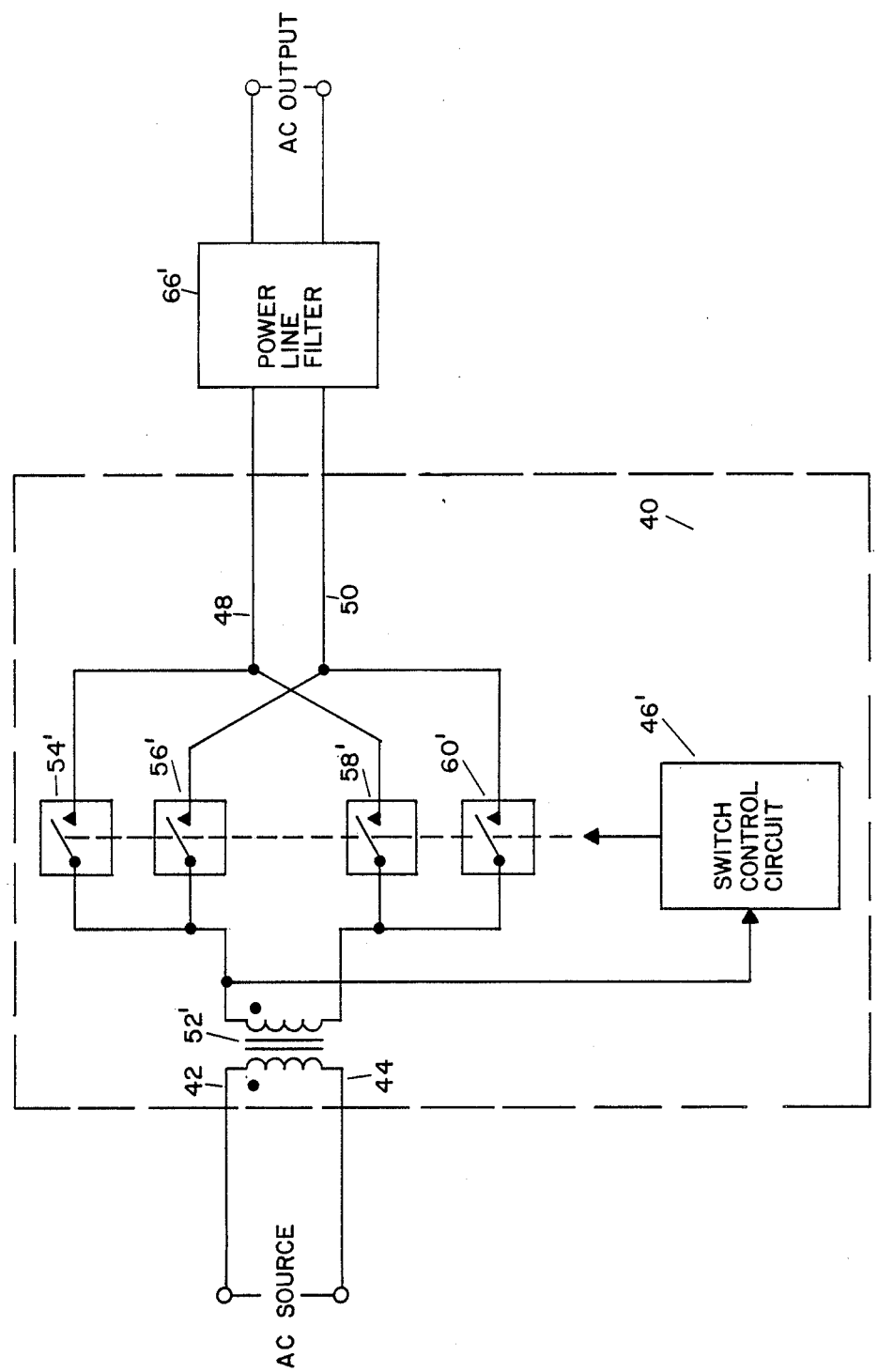

POWER SUPPLY FREQUENCY CONVERTER

BACKGROUND OF THE INVENTION

This invention relates to frequency converters generally and, more particularly, to a novel AC frequency converter having a higher efficiency and a lower weight/rating ratio than conventional frequency converters.

There are a number of situations where it is desirable to convert AC power at one frequency to AC power at a lower frequency. For example, most aircraft and some ground-based installations have only 400-450 Hz AC electric power available for operation of computer and control instruments. This situation results from the optimization of generator size to give satisfactory power characteristics while minimizing the weight and size of the on-board generators. While these generators satisfactorily service those applications for which they are designed, there are a number of scientific and commercial devices that are designed to be powered only by 50-60 Hz sources. When these are to be used where only the higher frequency power is available, it is necessary to provide means to convert the 400-450 Hz power to 50-60 Hz in order to accommodate such scientific and commercial devices.

Known prior art converters to provide such frequency conversion operate by first rectifying the AC power to DC power and then driving an oscillator unit to provide the desired frequency. These converters serve their intended functions, but are relatively costly to manufacture and are relatively large in size and heavy in weight.

It is, therefore, an object of the present invention to provide a frequency converter that is relatively economical to manufacture.

It is another object of the invention to provide a frequency converter that is relatively small in size and light in weight for a given rating.

It is an additional object of the invention to provide a frequency converter that can convert 400-450 Hz AC power to 50-55 Hz AC power.

SUMMARY OF THE INVENTION

The present invention achieves the above objects, among others, by providing apparatus for converting a supplied AC input signal into an AC output signal having a selected lower frequency than the frequency of the AC input signal, which apparatus includes means for transisting individual half cycles of the supplied AC input signal to an intermediate output signal with selected amplitude and polarity such that during successive pairs of first and second periods, each such period corresponding to a predetermined number of half cycles of the AC input signal, the translated half cycles of the AC input signal all have the same first selected polarity during each first period and have the same second selected polarity during each second period, with the first and second polarities being opposite. Means are included for filtering the intermediate output signal to develop the AC output signal having the selected lower frequency. Thus, the frequency of the AC output signal will be a selected fraction of the frequency of the AC input signal, the fraction being equal to the frequency of the AC input signal divided by the predetermined selected number of half cycles.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 4 is a variation of the embodiment of FIG. 3.

DETAILED DESCRIPTION OF THE INVENTION

Figure 1:
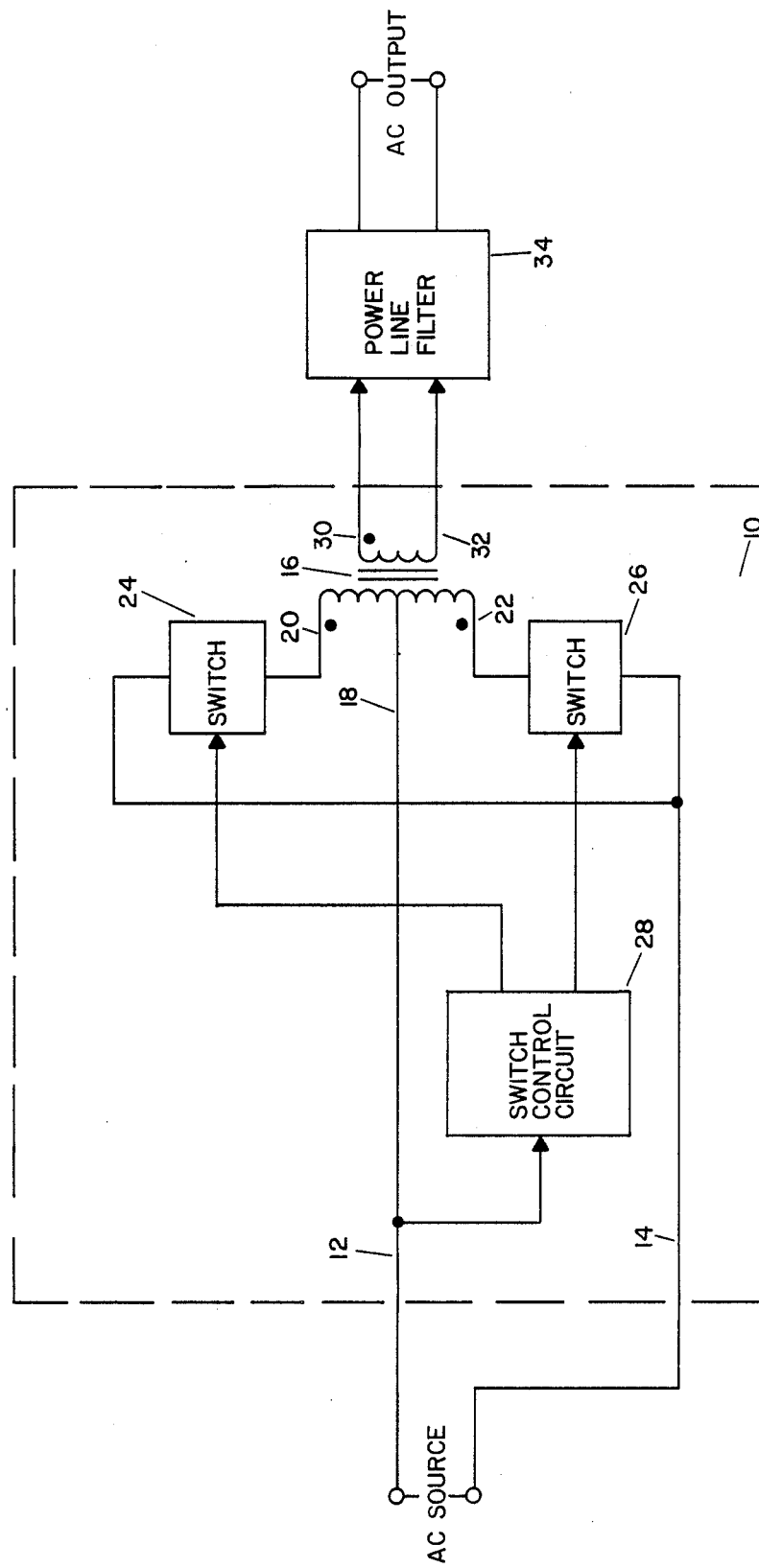
FIG. 1 is a partial schematic, partial block diagram of a frequency converter according to the present invention.

FIG. 1 shows an embodiment of a frequency converter according to the present invention, generally indicated by the reference numeral 10. Frequency converter 10 includes input leads 12 and 14 connected to a source of AC power, with input lead 14, for purposes of this description, being assumed to be at ground potential. Frequency converter 10 also includes a transformer 16 having a center-tapped primary, the center tap 18 of which is connected to input lead 12. Outer ends 20 and 22 of the primary are connected to input lead 14 through single-pole, single-throw switches 24 and 26, respectively. Switches 24 and 26 may be triacs or power MOSFETs or any other controllable switch known in the art having a switching time less than of the order of 100 microseconds, when the input power is at 400-450 Hz, for example, and a current rating preferably of the order of the desired converter output current divided by 0.854. The reason for the latter characteristic will be made apparent below. An example of a suitable switch for high-power applications is the Gentron EFM 119-M53 power MOSFET.

Input lead 12 is also connected to switch control circuit 28 which is connected, as shown, to control the switching of switches 24 and 26. Switch control circuit 28 may be any suitable circuit known in the art which is capable of synchronizing to the frequency of the AC signal supplied to its input and controlling switches 24 and 26 so that only one switch is "on" at any given time. It can be seen from FIG. 1 that when switch 26 is "on", the potential produced across the secondary of transformer 16 will be in phase with the input AC source connected to leads 12 and 14, and, when switch 24 is on, the potential produced across the secondary taps will be 180 degrees out of phase with the input.

Figure 2A:
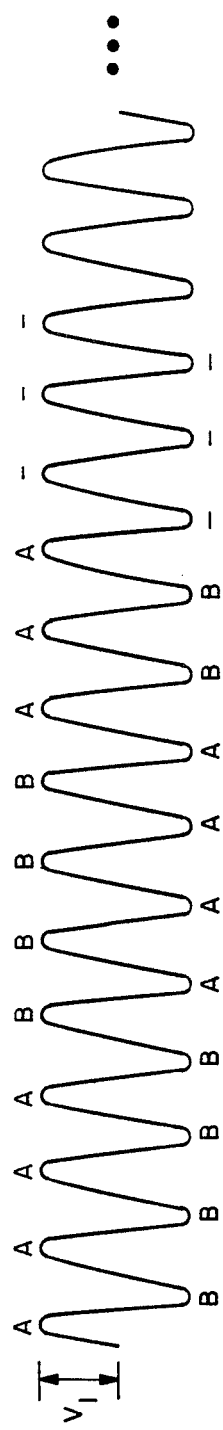
FIGS. 2(a), 2(b), and 2(c) show input and output waveforms useful in explaining the operation of the embodiments of FIGS. 1, 3 and 4.

FIG. 2(a) shows the waveform of the AC input voltage applied to frequency converter 10. When the switching described above is effected in accordance with the teaching of the present invention, the voltage waveform shown in FIG. 2(b) will be produced at secondary leads 30 and 32 of transformer 16. This is accomplished by the switching control circuit 28 turning switch 26 "on" during the half-cycles of the input waveform which are indicated by the letter "A" in FIGS. 2(a) and 2(b) and turning switch 24 "on" during the half-cycles of the input waveform which are indicated by the letter "B" in FIGS. 2(a) and 2(b). As can be seen from FIGS. 2(a) and 2(b), the pattern of energization of switches 24 and 26 is reversed every four cycles of the input waveform to produce the rectified pattern of the waveform of FIG. 2(b) which is seen to have a periodicity one-eighth that of the input waveform of FIG. 2(a), or 50/55 Hz, when the frequency of the input power source is 400–450 Hz. Expressed another way, for the first set of four full cycles of the input waveform, the odd-numbered half-cycles are replicated at the secondary of transformer 16 and 180 degree inversions of the even-numbered half-cycles are produced at the secondary, with the pattern being reversed for each succeeding set of four cycles. The AC signal appearing on the output leads 30 and 32 of transformer 16 may be filtered in power line filter 34, which may be of any suitable type known in the art, to produce the filtered waveform shown in FIG. 2(c).

When transformer 16 has a ratio of 1:1 for each half of the primary to the secondary, it is found that the AC output voltage=0.854×the AC input voltage. Thus, a transformer having a step-up ratio of 0.854:1 will produce an output voltage equal to the input voltage. For this reason, it is preferable that switches 24 and 26 have power ratings of at least the desired converter output current divided by 0.854. Of course, it may be desirable in some applications to employ a step-down transformer.

Fourier analysis of the waveform of the AC output of frequency converter 10 reveals that only odd harmonics of the input waveform exist and, therefore, more effective filtering of the output can be achieved by power line filter 34.

The theoretical efficiency of frequency converter 10 is determined by squaring the 0.854 factor, which gives a 75 percent efficiency. In reality, transformer 16 and power line filter 34 have a combined efficiency of the order of 90 percent. In contrast, the efficiency of known prior art frequency converter power supplies is of the order of 50 percent maximum.

Figure 3:
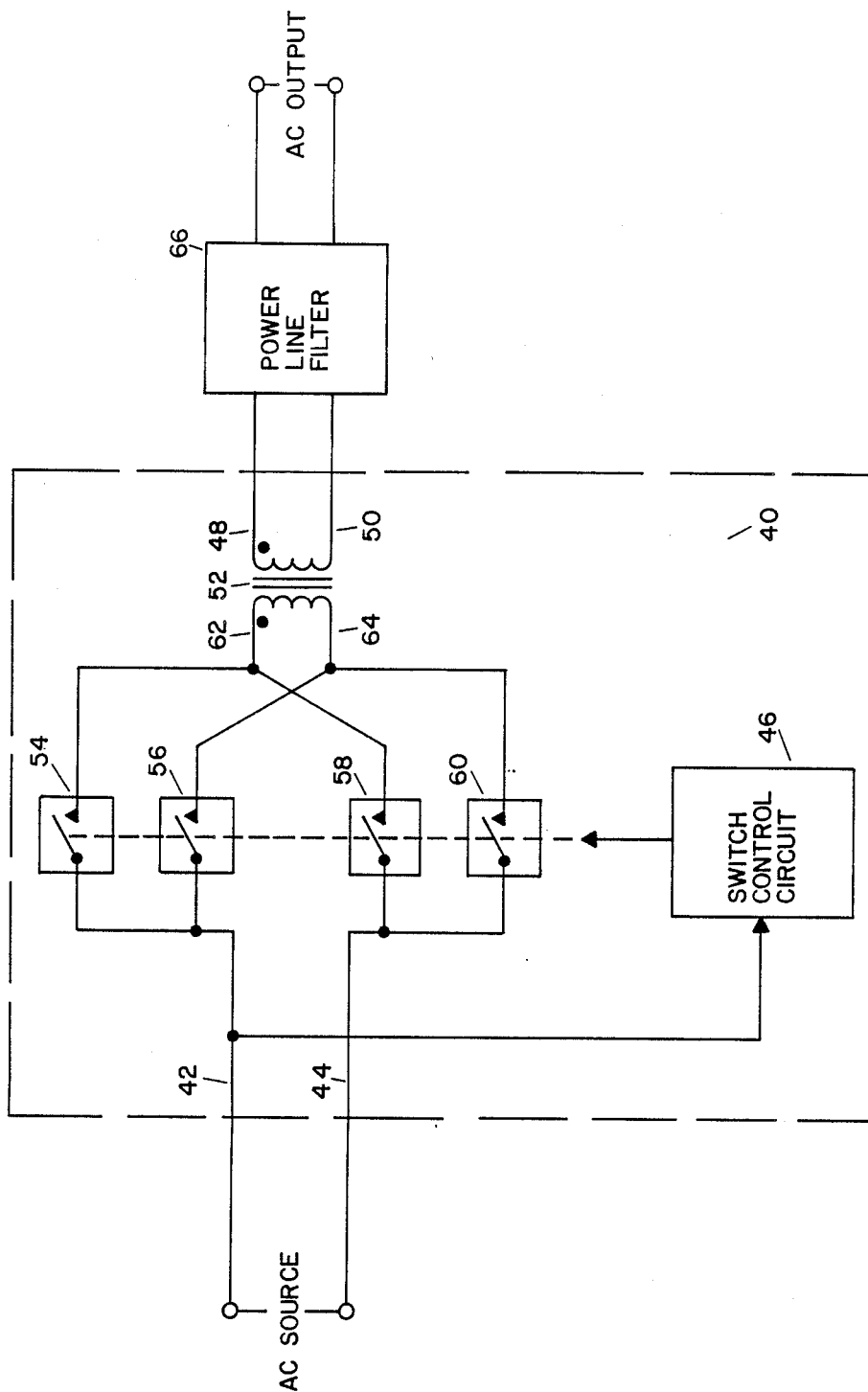
FIG. 3 is a partial schematic, partial block diagram of an alternative embodiment of the present invention.

An alternative embodiment of a frequency converter according to the present invention is shown in FIG. 3 and is indicated generally by the reference numeral 40. As with frequency converter 10 shown on FIG. 1, frequency converter 40 includes input leads 42 and 44, a switch control circuit 46, and secondary leads 48 and 50 of a transformer 52 having no center-tapped primary. Here, polarity inversion of the input to the primary of transformer 52 is achieved by the paired switching by switch control circuit 46 of four switches 54, 56, 58 and 60; where switch 54 is connected between input lead 42 and primary lead 62 of transformer 52, switch 56 is connected between input lead 42 and primary lead 64, switch 58 is connected between input lead 44 and primary lead 62, and switch 60 is connected between input lead 44 and primary lead 64. It will be recognized that each switch pair (i.e. 54–56 and 58–60) can be replaced by a SPDT type switch.

Figure 2B:
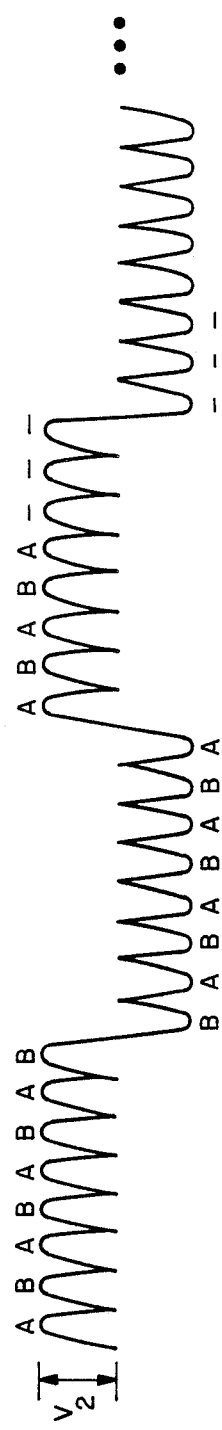
Figure 2C:
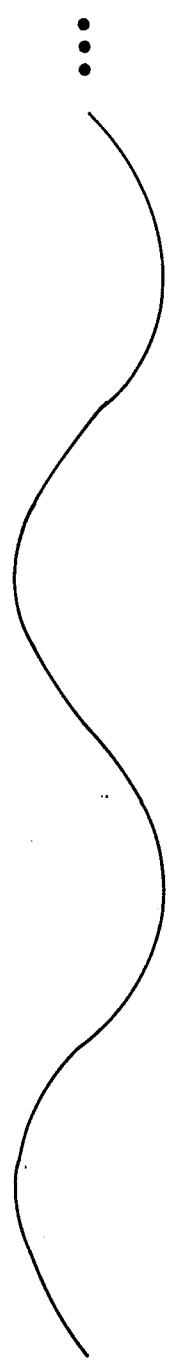

Appropriate switching of switches 54 through 60 in pairs produces the waveform of FIG. 2(b). For example, when switches 54 and 60 are turned "on" and switches 56 and 58 are turned "off", as shown in FIG. 3, the in-phase voltage half-cycles indicated by the letter "A" will be produced at the secondary of transformer 52. When switches 54 and 60 are turned "off" and switches 56 and 58 are turned "on", the out-of-phase half-cycles indicated by the letter "B" will be produced at the secondary. The output of the secondary may also be filtered in power line filter 66 to produce the waveform shown in FIG. 2(c). The above comments relating to step-up ratio and switch rating are relevant here also.

The embodiment shown in FIG. 3 may be advantageous if the non-center-tapped transformer 52 can be designed with a higher efficiency than a center-tapped transformer. Also, this configuration allows flexibility to place transformer 52 after switches 54 through 60, as shown in FIG. 3, or before the switches, as shown in FIG. 4. In FIG. 4, the primed reference numerals identify elements having the same functions as those identified by corresponding unprimed numerals in FIG. 3.

The embodiment shown in FIG. 3 could be modified by eliminating transformer 52. That, of course, simplifies the frequency converter, but at the expense of losing the advantageous isolation and voltage step-up possible with a transformer. Thus, with such an arrangement, the frequency converter output would be about 100 volts with a 115–120 volt input.

It will be appreciated that the transformer used in the embodiments shown in FIGS. 1 and 3 could be designed to inherently provide the filtering provided by separate power line filters 34 and 66 in FIGS. 1 and 3, respectively, so that the latter could be eliminated to simplify the frequency converter and reduce its cost. Furthermore, in the embodiments of FIG. 3, it may be desirable to full wave rectify the AC input signal preceeding switches 54, 56, 58, 60 and to synchronize the switch control circuit 46 from the rectified signal. This should reduce the complexity of the control circuit and permits the switches to operate at a slower rate, thus increasing reliability and enabling lower cost switches to be used.

The embodiments of the present invention described above produce an output frequency that is 1/8th that of the input frequency. However, the invention is not limited to this conversion ratio. Those skilled in the art will recognize the invention can be used to produce frequency converters having other input to output frequency conversion ratios. For example, with a 400 Hz input, a conversion ratio of 6:1 or 7:1 would produce an output frequency of 67 Hz or 57 Hz, respectively, which would also be useful in the applications described above. To produce these output frequencies with the embodiment of FIG. 1, for example, the pattern of energization of switches 24 and 26 would be reversed every 3 or 3½ cycles, respectively, of the input waveform instead of every 4 cycles as shown in FIG. 2.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for converting a supplied alternating current (AC) input signal into an AC output signal having a selected lower frequency than the frequency of said AC input signal, comprising:

means for translating individual half cycles of said supplied AC input signal to an intermediate output signal with selected amplitude and polarity such that during successive pairs of first and second periods, each said period corresponding to a predetermined number of half cycles of said AC input signal, the translated half cycles of said AC input signal all have the same first selected polarity during said first periods and have the same second selected polarity during said second periods, said first and second polarities being opposites; and means for filtering said intermediate output signal to develop said AC output signal having said selected lower frequency.

2. The apparatus of claim 1, further comprising:

input means to receive said AC input signal;

intermediate output means to provide said intermediate output signal;

first and second switching means connected between said input and intermediate output means;

switch control means operatively connected to control said first and second switching means;

during at least one said first period, said switch control means will cause;

said first switching means to produce on said intermediate output means the 180 degree inversion of each even numbered half-cycle of said AC input signal; and said second switching means to replicate on said intermediate output means the odd numbered half-cycles of said AC input signal; and during each consecutive said second period, following each said at least one said first period, said switch control means will cause:

said first switching means to produce on said intermediate output means the 180 degree inversion of each odd numbered half-cycle of said AC input signal; and said second switching means to replicate on said intermediate output means each even-numbered half-cycle of said AC input signal; whereby, said frequency of said AC output signal will be a selected fraction of said frequency of said AC input signal, said fraction being equal to said frequency of said AC input signal divided by said predetermined number of half cycles.

3. The apparatus of claim 2, further comprising a transformer, having primary and secondary windings; connected between said intermediate output means and said first and second switching means; and said switch control means will cause:

said first switching means to cause current in said primary winding to flow in one direction; and said second switching means to cause current in said primary winding to flow in the opposite direction.

4. The frequency converter of claim 3 wherein said primary winding is of the center-tap type; and said switch control means will cause:

said first switching means to cause current in one half of said primary to flow in one direction; and said second switching means to cause current in the other half of said primary to flow in the opposite direction.

5. The frequency converter of claim 2 further comprising a transformer connected between said input means and said first and second switching means.

* * * * *